O. H. GOETZ.
AUTOMOBILE BUMPER.
APPLICATION FILED NOV. 6, 1920.
1,381,182.
Patented June 14, 1921.
2 SHEETS—SHEET 1.
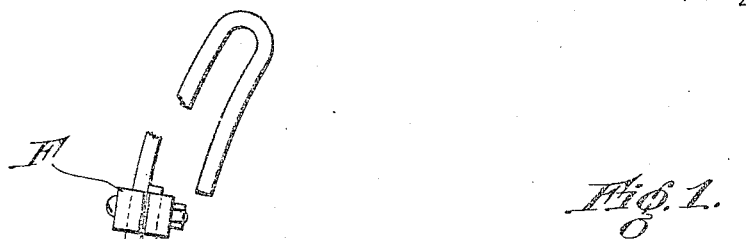
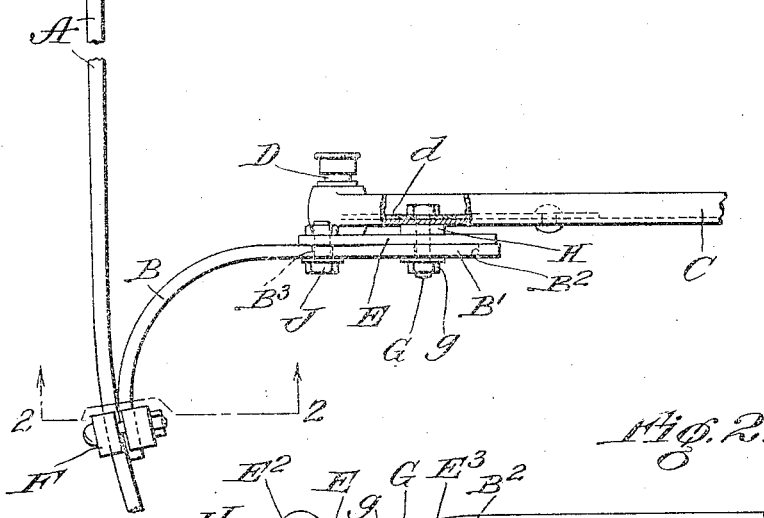
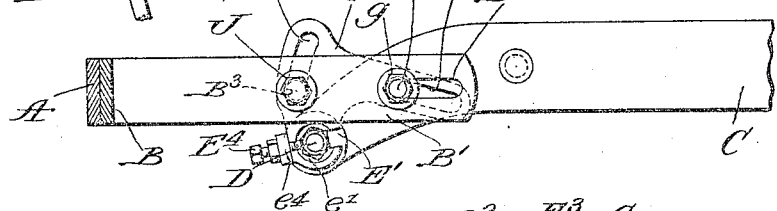
Witness:
F. Gathmann
Inventor:
Oscar H. Goetz.
By Burton & Burton
his Attorneys

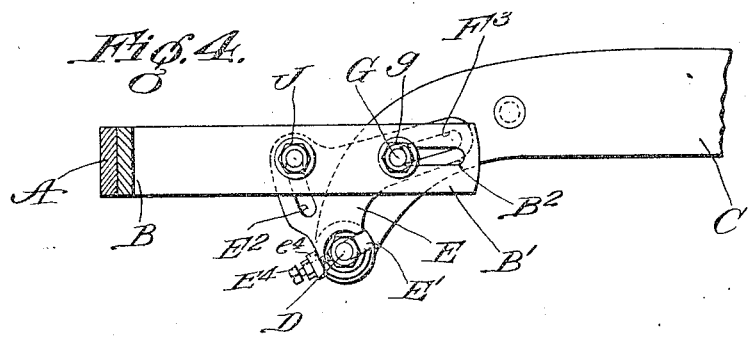
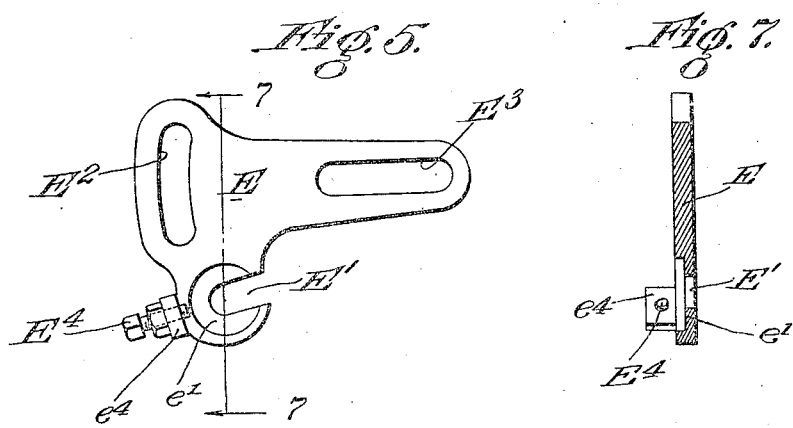
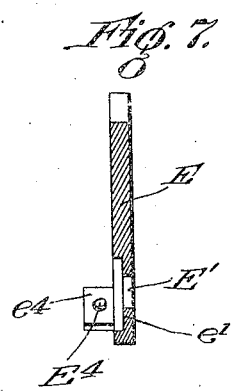
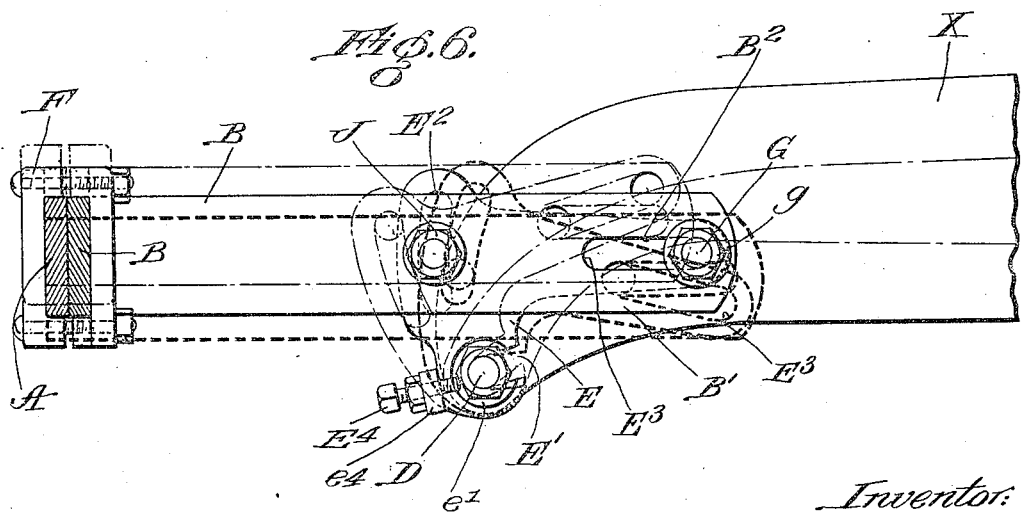

UNITED STATES PATENT OFFICE.

OSCAR H. GOETZ, OF CHICAGO, ILLINOIS, ASSIGNOR TO STEWART-WARNER SPEEDOMETER CORPORATION, OF CHICAGO, ILLINOIS, A CORPORATION OF VIRGINIA.

AUTOMOBILE-BUMPER.

1,381,182.   Specification of Letters Patent.   Patented June 14, 1921.

Application filed November 6, 1920. Serial No. 422,143.

*To all whom it may concern:*

Be it known that I, OSCAR H. GOETZ, a citizen of the United States, residing at Chicago, in the county of Cook and the State of Illinois, have invented certain new and useful Improvements in Automobile-Bumpers, of which the following is a specification, reference being had to the accompanying drawings, forming a part thereof.

The purpose of this invention is to provide an improved construction of automobile bumper, particularly with respect to the means for mounting the same upon the side bars of the vehicle to be served. It consists in the elements and features of construction shown and described, as indicated in the claims.

In the drawings:

Figure 1 is a plan view of a bumper embodying this invention, the same being shown secured to the two opposite side arms of the vehicle to be served.

Fig. 2 is a section at the line, 2—2, on Fig. 1, showing in side elevation the manner of mounting the bumper upon the vehicle side bar.

Fig. 3 is a view similar to Fig. 2, showing the bumper adjusted to a different height from that shown in Fig. 2, for accommodating the mounting part, 2, in differently positioned bolt holes in the vehicle side bar.

Fig. 4 is a view similar to Figs. 2 and 3, showing the parts differently adjusted for accommodating them to the form of a differently curved forward terminal of the vehicle side bar.

Fig. 5 is a side elevation of the mounting bracket detached from the other parts.

Fig. 6 is a diagrammatic view delineating a conventional vehicle side bar of dimensions designed to include the entire range of variation of rivet position on side bars of the various automobiles in common use, for illustrating the range and manner of accommodation accorded by the mounting devices.

Fig. 7 is a section at the line, 7—7, on Fig. 5.

In the drawings there is shown a bumper having an impact bar, A, of familiar spring-bar construction, and supported on the vehicle by supporting arms, B, B, which may be understood to be spring bars for cushioning the shock of impact of the impact bar with an obstacle. The vehicle side bars, C, C, are shown of the familiar channel bar construction with downwardly-turned forward ends engaged with the forward ends of semi-elliptic springs by means of the shackle bolt, D, as usual.

The supporting arms, B, B, are identical in form, each comprising a directly fore-and-aft extending rear portion, $B^1$, the forward portions curved to an arc of about ninety degrees for securement of its forward transversely-extending ends against the impact bar, as by clamps, F, F. As shown and preferably, these supporting arms are symmetrical about a fore-and-aft-extending horizontal plane, so that they may be reversed or interchanged without affecting the height at which they support the impact bar, A. For securing the supporting arms, B, B, laterally against the vehicle side bars, C, C, there is provided a mounting bracket, E, which is a plate flat in general of T form or quasi-triangular mounted with the cross of the T extending up and down, the lower arm of the cross having a rearwardly-open notch, $E^1$, for engaging the shackle bolt, and the upwardly-extending arm of the T having a slot, $E^2$, extending up and down, and in general in an arc about a point in a longitudinally-extending slot, $E^3$, formed in the rear end of the triangular area of the plate or stem of the T. The directly fore-and-aft-extending rear end portions of each of the supporting arms, B, B, is provided with two securing features consisting of a bolt hole, $B^3$, and a longitudinally-extending slot, $B^2$, said features being positioned in the bar at the horizontal plane about which said supporting arm is symmetrical as above stated, the slot, $B^2$, having its longitudinal extent in said plane; and said slot and bolt hole are positioned with respect to each other and as to their distance apart so that upon the bracket being applied against the side of the supporting arm with the slot, $E^3$, coinciding with the slot, $B^2$, the bolt hole, $B^3$, will register with the slot, $E^2$, at some point in the length of the latter.

To mount the bumper of this construction on the vehicle, the shackle bolt nut is slackened to the amount of the thickness of the bracket plate, E, at the notch, $E^1$, where the plate is reduced in thickness as shown at $e^1$, to about one-eighth of an inch, and the bracket, E, is then engaged by the shackle bolt by means of its rearwardly open notch, E¹, the shackle bolt nut being tightened sufficiently to keep the bracket from falling off while the remainder of the adjustment is made, but leaving it sufficiently loose so that the bracket can be turned upon the shackle bolt to find one of the rivets by which the shackle knuckle is secured to the channel bar which may be registered with some point in the length of the slot, E³, of the bracket. A suitable rivet having been selected, that rivet will be driven out, and if necessary the rivet hole enlarged to a diameter sufficient to receive a clamping bolt, G, of sufficient length to extend through the web of the vehicle side bar, C, across the distance to which the shackle knuckle, d, may be found protruding beyond the plane of the outer face of the web, and through the bracket, E, and the supporting arm, B, and there-beyond sufficiently to receive a securing nut, g. The bumper-supporting arm being now introduced over the shackle bolt between the rearwardly-extending stem of the T-bracket, E, and the vehicle side bar, the bolt, G, will be inserted through the enlarged rivet hole spacing washers, H, being introduced between the outer surface of the vehicle side bar and the inner surface of the bracket, E, to a sufficient thickness to cause the bracket to extend substantially directly fore-and-aft when it is lodged against the side of the knuckle; the securing nut, g, is then applied but not tightened. The arm, B, now extends forward alongside the upwardly-projecting forward portion of the bracket, E; and a bolt, J, is introduced through the slot, E², and the bolt hole, B¹, and the nut, j, applied thereon for retaining it. Both bumper arms, B, B, being mounted in this manner, the impact member, A, being secured to their forward ends, the bumper may be positioned horizontally and as desired as to height and in directly transverse position; and thereupon all the bolts, including the shackle bolt being tightened, the bumper will be found accurately and securely positioned and retained in such manner that the rear thrust of the impact will be distributed between the shackle bolt and the bolts, G and J, operating with a direct shearing thrust thereon, while the parts are held against sliding,—largely saving the shearing thrust,—by the friction applied by the clamping of said bolts. It will be observed that this construction permits interchange and reversal of the supporting arms, B, B, without affecting the height at which the bumper impact member is positioned. It will be observed and recognized as an important purpose of the particular construction shown, that thereby there is afforded a wide range of accommodation to different vehicle side bars having the rivets the holes for which are to be utilized for receiving the bolt, G, quite differently positioned. Fig. 6 is designed to illustrate the range of accommodation in this respect, the conventional side bar, X, being what may be called a "composite" representation of side bars having rivets at a multiplicity of positions, and serving to illustrate the range of positions at which these rivets are found in different automobile side bars, the several dotted line positions of the bumper arm and bracket, E, being designed to indicate the range of accommodation to the different rivet positions indicated.

Although this device is designed to take advantage of the spring shackle bolt of the vehicle side bar as a lodgment and engagement and to take the rear thrust of the bumper supporting arm, it will be obvious that any transversely-projecting abutment on the side bar may be as utilized and may be provided for that purpose if not present.

A set screw, E⁴, set into the bracket plate, E, opposite the notch, E¹,—a lug, e⁴, being provided for that purpose,—serves for setting against a face of the shackle-bolt nut or head to lock the nut or bolt against turning.

I claim:—

1. In an automobile bumper designed for mounting laterally against the side bar of the vehicle to be served, in combination with an impact member, supporting arms each having longitudinally separated from each other a bolt hole and a longitudinally-extended slot; a mounting bracket adapted to be engaged with the spring shackle bolt of the vehicle, and having a slot corresponding to the slot of the supporting arm, and a second slot extending up and down at a distance from the first slot substantially agreeing with the distance between the bolt hole and the slot of the supporting arm; a bolt for taking through the corresponding slots of the arm and bracket respectively, to clamp said parts against the vehicle side bar, and a second bolt taking through the bolt hole of the arm and the second slot of the bracket for clamping said parts together.

2. In the construction defined in claim 1, foregoing, the supporting arm being symmetrical about a fore-and-aft extending horizontal plane, and the bolt hole and slot therein being at that plane; whereby the right and left arms of the bumper are reversible and interchangeable without affecting the height of the impact bar carried thereby.

3. In the construction defined in claim 1, foregoing, the bracket's means of engagement with the shackle bolt being a rearwardly-open notch.

4. In an automobile bumper in combination with the side bars of a vehicle to be served having a transversely projecting abutment; an impact member and supporting arms therefor, each having longitudinally separated from each other a bolt hole and a longitudinally-extended slot; a mounting bracket adapted to be engaged with said abutment, and having a slot corresponding to the slot of the supporting arm, and a second slot extending up and down at a distance from the first slot substantially agreeing with the distance between the bolt hole and the slot of the supporting arm; a bolt for taking through the corresponding slots of the arm and bracket respectively, to clamp said parts against the vehicle side bar, and a second bolt taking through the bolt hole of the arm and the second slot of the bracket for clamping said parts together.

5. In the construction defined in claim 1 foregoing, the bracket having a set screw projecting transversely of the shackle-bolt-engaging notch for impinging against a face of the shackle bolt nut or head, for locking the nut or bolt against rotation.

In testimony whereof, I have hereunto set my hand at Chicago, Illinois, this 29th day of October, 1920.

OSCAR H. GOETZ.